INVENTOR
THEODORE F. FISHER
ATTORNEY

United States Patent Office 3,373,574
Patented Mar. 19, 1968

3,373,574
RECOVERY OF C₂ HYDROCARBONS FROM GAS
MIXTURES CONTAINING HYDROGEN
Theodore F. Fisher, Buffalo, N.Y., assignor to Union
Carbide Corporation, a corporation of New York
Filed Apr. 30, 1965, Ser. No. 452,220
11 Claims. (Cl. 62—20)

ABSTRACT OF THE DISCLOSURE

A process for separating methane and C₂ hydrocarbon condensibles from hydrogen by cooling to liquefy the hydrocarbons, throttle expanding the liquefied condensibles, and partially rewarming the latter for 15–70% evaporation before separating the methane vapor.

---

This invention relates to an improved process for recovering C₂ hydrocarbons from gas mixtures, and in particular ethylene and/or ethane from a gas mixtures also containing hydrogen and methane.

Many chemical processes produce by-product or waste gas streams containing potentially valuable hydrogen, methane and C₂ hydrocarbons in significant quantities. The practical value of these components has been small due to the difficulty of stream separation. In one well-known method of separation a gaseous mixture under pressure is cooled and partially liquefied, and the resultant liquid and vapor phases are separated. The liquid fraction is more concentrated in the higher boiling methane and C₂ hydrocarbons while the vapor consists primarily of hydrogen and other lower boiling constituents. The hydrogen vapor is withdrawn and warmed against incoming feed mixture and the liquid fraction is throttled, vaporized and warmed, also in heat exchange with the feed. The quantity and degree of throttling of the liquid influences the temperature level at the phase separator, and therefore it determines the completeness of the fluid separation. This method is only moderately successful in the recovery of C₂ hydrocarbons from refinery by-products streams; the simple partial condensation process does not achieve a sharp separation between methane and the C₂ hydrocarbons (ethylene and ethane). This limitation is illustrated by separation of a demethanizer overhead gas at 35 atmospheres pressure having the following composition: $H_2=68$ volume percent, $CH_4=25\%$, $C_2H_2=5\%$ and $N_2=2\%$. The highest ethylene purity obtainable is less than 65% and even this purity can be achieved only at low recovery on the order of 10% (see curve A of FIG. 4).

Some improvement in C₂ purity-recovery can be obtained by adding a second-stage separator to the partial condensation-vaporization process. That is, the liquid fraction from the first separator is further throttled and the stream again separated. This additional separation step permits higher C₂ hydrocarbon purities on the order of 85% but at the expense of poor recovery, i.e., 30% (see curve B of FIG. 4). The prior art has not employed further pressure reduction of the remaining gas mixture vapor to below atmospheric pressure because of the expense and hazards involved. Vacuum pumping is costly because of the additional power and equipment required and because of the reduced thermal efficiency due to spreading the cold end $\Delta T$ in the heat exchanger. It is hazardous because of the risk of air leakage into the system to form explosive mixtures with the hydrocarbon.

The above described C₂ hydrocarbon recovery-purity characteristic represents the best separation heretofore obtainable in simple partial condensation-vaporization equipment. For higher degrees of separation it has been necessary to employ more complex and expensive distillation towers.

An object of this invention is to provide an improved process for recovering C₂ hydrocarbons from gas mixtures also containing hydrogen and methane.

Another object is to provide such a process using simple partial condensation-vaporiaztion equipment.

A further object is to provide a process for improved separation of C₂ hydrocarbons and methane characterized by high product recovery and purity employing simple partial condensation-vaporization equipment and without necessarily requiring distillation equipment. Other objects and advantages in this process will be apparent in the ensuing disclosure and drawing in which.

In one embodiment of this invention a process is provided for separating methane and C₂ hydrocarbon condensibles from a gas mixture with hydrogen. As used herein the term "C₂ hydrocarbons" refers to ethylene and/or ethane and does not include acetylene. The gas mixture is cooled at pressure of at least 10 atmospheres to about the liquefaction temperature of methane whereupon the hydrogen gas and liquefied condensibles are separated. The liquefied condensibles are throttle expanded to a sufficiently lomer pressure to form a methane-rich vapor fraction and a C₂ hydrocarbon-enriched liquid fraction— below about 5 atmospheres. These two fractions are then separated.

The particular improvement in this process comprises partially rewarming the liquefied condensibles prior to the methane vapor-C₂ hydrocarbon liquid separation by heat exchange with the cooling gas mixture sufficiently to evaporate between about 15 percent and 70 percent of the condensibles. This partial rewarming and evaporation may be done before or after the throttled expanding step. The effect of the partial reheating-evaporating step is to reduce the equilibrium content of methane in the liquid condensed from the hydrogen so that a larger fraction of the methane is released in the subsequent methane vapor-C₂ hydrocarbon liquid separation step. Evaporation of at least 15 percent of the condensibles is necessary to provide a significant enrichment of C₂ hydrocarbons in the remaining liquid. More than 70 percent evaporation results in excessive loss of C₂ hydrocarbons in the vapor phase. The purity and percent recovery of the final C₂ hydrocarbon product depends largely on the extent to which methane is separated as vapor and the amount of C₂ hydrocarbons lost in this vapor. A C₂ fraction much improved in purity and quantity is thus obtained and is demonstrated by curves C and D of FIG. 4 to be described hereinafter.

For a given product purity, the partial reheating step permits conducting the initial separation from the non-condensibles at a lower temperature with resultant reduced losses of C₂ hydrocarbons in the separated non-condensible stream. The partial rewarming step is beneficial for methane-C₂ hydrocarbon separations where the relative volatility is on the order of 80.

Figure 1:
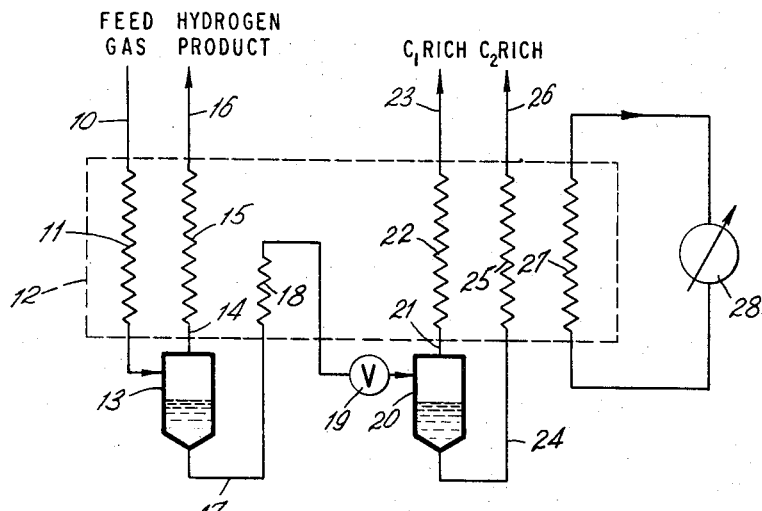
FIG. 1 is a schematic flowsheet of apparatus arranged according to a two pressure stage embodiment of the process of this invention.

The invention will be more clearly understood by reference to the drawings. In FIG. 1 the feed gas mixture containing hydrogen, methane, ethylene and/or ethane and possibly small amounts of low boiling impurities such as nitrogen, carbon monoxide and carbon dioxide is supplied to conduit 10 at about 170–300° K. at 10 to 40 atmospheres. This feed mixture is cooled in passageway 11 of heat exchange zone 12 sufficiently for partial liquefaction therein, and the resultant stream is phase separated in vessel 13. The gaseous hydrogen-rich phase is directed through conduit 14 to passageway 15 in heat exchange zone 12 where it serves to cool the countercurrently flowing incoming feed mixture in thermally associated passageway 11. The resulting warmed hydrogen-rich gas is discharged through conduit 16 as product.

The liquid fraction containing methane and $C_2$ hydrocarbons is withdrawn from separator 13 through conduit 17, partially rewarmed to an intermediate temperature of about 130 to 195° K. in passageway 18 in zone 12 and provides part of the refrigeration necessary to partially liquefy the countercurrently flowing feed gas mixture in thermally associated passageway 11. Between about 15 and 70% of the liquid in conduit 17 is vaporized in passageway 18 and the resulting second liquid-vapor mixture is throttled to between about 1.2 and 5 atmospheres pressure through valve 19 thereby vaporizing additional methane. Although the liquid-vapor mixture is not necessarily cooled by the Joule-Thompson effect in passing through valve 19, such cooling is preferred to the extent of at least about 5° C. The throttled preferably further cooled methane-$C_2$ hydrocarbon mixture is passed to second separator 20 for additional phase separation. The vapor thus released from solution is rich in methane, and is rewarmed by venting through conduit 21 to passageway 22 where its sensible refrigeration is recovered by the countercurrently flowing feed gas mixture in thermally associated passageway 11 of zone 12. The warmed methane-rich gas is then discharged through connecting conduit 23. The residual liquid in separator 20 is enriched in $C_2$ hydrocarbon, withdrawn through conduit 24 and vaporized in passageway 25 of zone 12 by heat exchange with the feed gas mixture in thermally associated passageway 11. The resulting warmed gas is withdrawn as $C_2$-rich product in conduit 26. Any refrigeration needs of the system not provided by the vaporization and/or rewarming of the hydrogen, $C_1$-rich and $C_2$ enriched product streams is furnished by auxiliary means illustrated generally by passageway 27 and heat rejecting exchanger 28. This external refrigeration system for example may comprise a conventional compression-condensation closed circuit employing nitrogen as the refrigerant.

Figure 4:
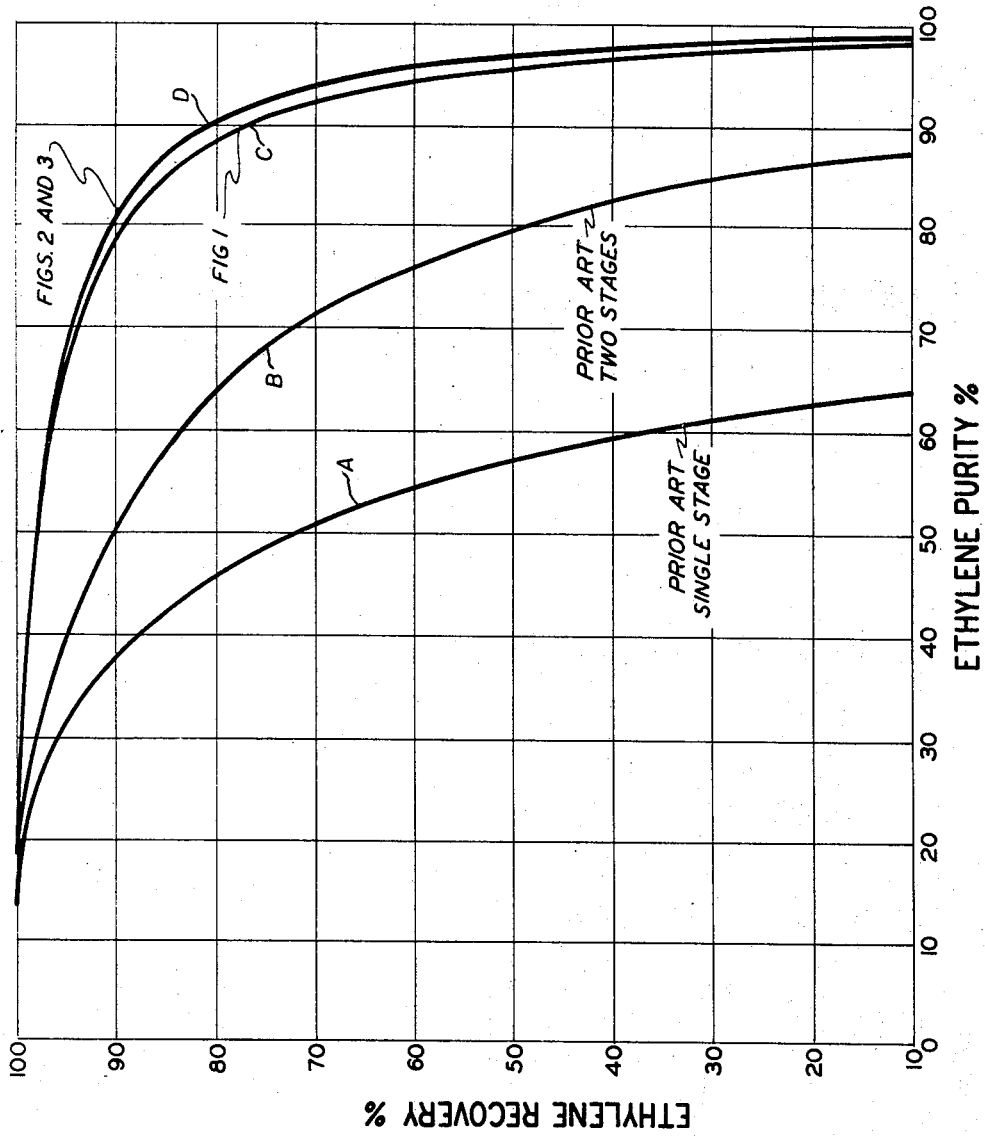
FIG. 4 is a graph demonstrating the improvement afforded by the present process over prior art schemes in terms of higher ethylene recovery percent and purity.

The effect of partially rewarming and evaporating the liquid condensibles in passageway 18 prior to the methane vapor-ethylene liquid separation is illustrated by curve C of FIG. 4 which is based on the same feed mixture condition and composition as represented by the prior art process curves A and B. It will be seen that in the range of high ethylene recovery the curve is surprisingly flat. Operating near the "knee" of the curve permits 85% recovery of 85% pure ethylene using the FIG. 1 embodiment of the invention. In marked contrast, with an ethylene recovery of 85% using the prior art process represented by curve B, the ethylene purity is only 57%. On the other hand, if an ethylene purity of 85% is needed using the prior art two stage partial condensation-vaporization, curve B indicates that only 28% of the ethylene may be recovered. The quantitative and qualitative relationship between the prior art and present process is similar to that illustrated in FIG. 4 when the $C_2$ hydrocarbon is ethane. It will be obvious from the foregoing that the present invention permits recovery of $C_2$ hydrocarbons for other uses whereas the prior art has often of necessity burned same as part of a fuel gas mixture.

Figure 2:
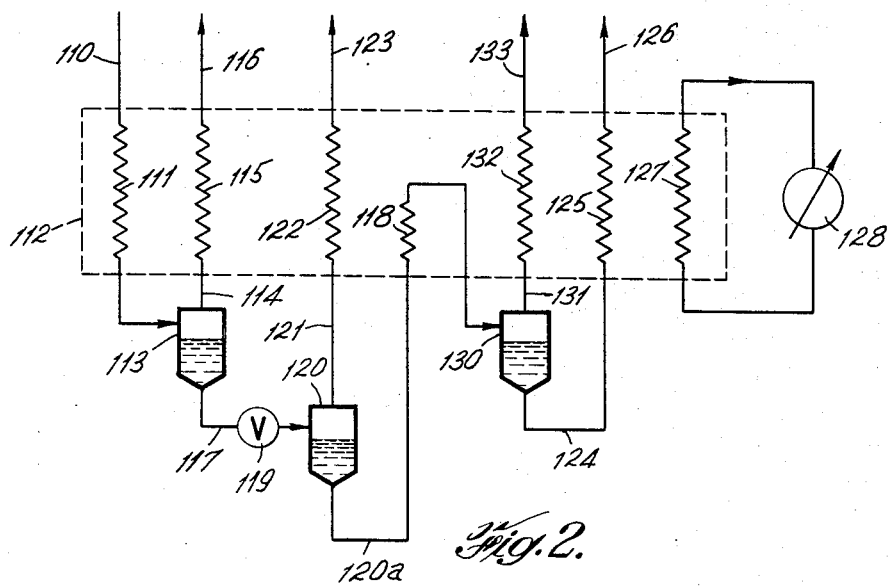
FIG. 2 is a schematic flowsheet of another embodiment similar to FIG. 1 but employing three pressure stages.

FIG. 2 illustrates another embodiment in which a third separator is employed to further improve the separation of methane and $C_2$ hydrocarbons. Items corresponding to components illustrated in FIG. 1 have been identified by the same number plus 100 in FIG. 2 and plus 200 in FIG. 3. In one plant operating according to FIG. 2, a feed mixture comprising 43 mole percent hydrogen, 43% methane and 14% ethylene at pressure of about 40 atm. and temperature of 206° K. is cooled in passageway 111 to about 157° K. and directed to first separator 113. The vapor is withdrawn therefrom, warmed in passageway 115 and discharged as a mixture comprising 70% hydrogen, 29% methane and 1% ethylene. The liquid is withdrawn through conduit 117 and throttled in valve 119 to about 6.9 atm. and 145° K.—a temperature drop of 12°. The resulting liquid-vapor mixture is then directed to second separator 120 and a first methane-rich vapor fraction withdrawn through conduit 121 to passageway 122 in zone 112 for transfer of its refrigeration to the feed gas in thermally associated passageway 111. The resulting warmed methane-rich gas is discharged through conduit 123. The remaining liquid is withdrawn from second separator 120 through conduit 120a and partially rewarmed in reheat passageway 118 to about 172° K. thereby vaporizing about 52% of the liquid and forming a second methane-rich fraction. The resulting vapor-liquid mixture is directed to third separator 130, and a second methane-rich vapor vented therefrom through conduit 131 to passageway 132 for refrigeration transfer to the fed gas mixture is thermally associated passageway 111 of zone 112. The warmed second methane-rich gas is discharged through conduit 133 at the warm end of heat exchange zone 112. The ethylene-rich liquid is withdrawn from third separator 130 through conduit 124, warmed in passageway 125 and discharged at substantially ambient temperature through $C_2$ product conduit 126. Based on the above example, this stream contains about 80 mole percent ethylene and 20 mole percent methane.

In both the FIGS. 1 and 2 embodiments the methane-rich fraction is separated at the lowest temperature of the process after the throttling step where the value of ($Kc_2$) is a minimum. The equilibrium constant $Kc_2$ of $C_2$ hydrocarbon in mixture with methane is the ratio of the mole fraction of $C_2$ hydrocarbon in the vapor to the mole fraction of $C_2$ hydrocarbon in the liquid. It is the function of the intermediate or second separator 120 to remove a substantial quantity of methane (plus lower boiling components) under the conditions prevailing at the second separator which correspond to minimum loss of $C_2$ components in the vapor phase. Methane rejection at this point reduces the amount of methane which must be rejected in the final separator under warmer conditions corresponding to a higher value of $Kc_2$.

Figure 3:
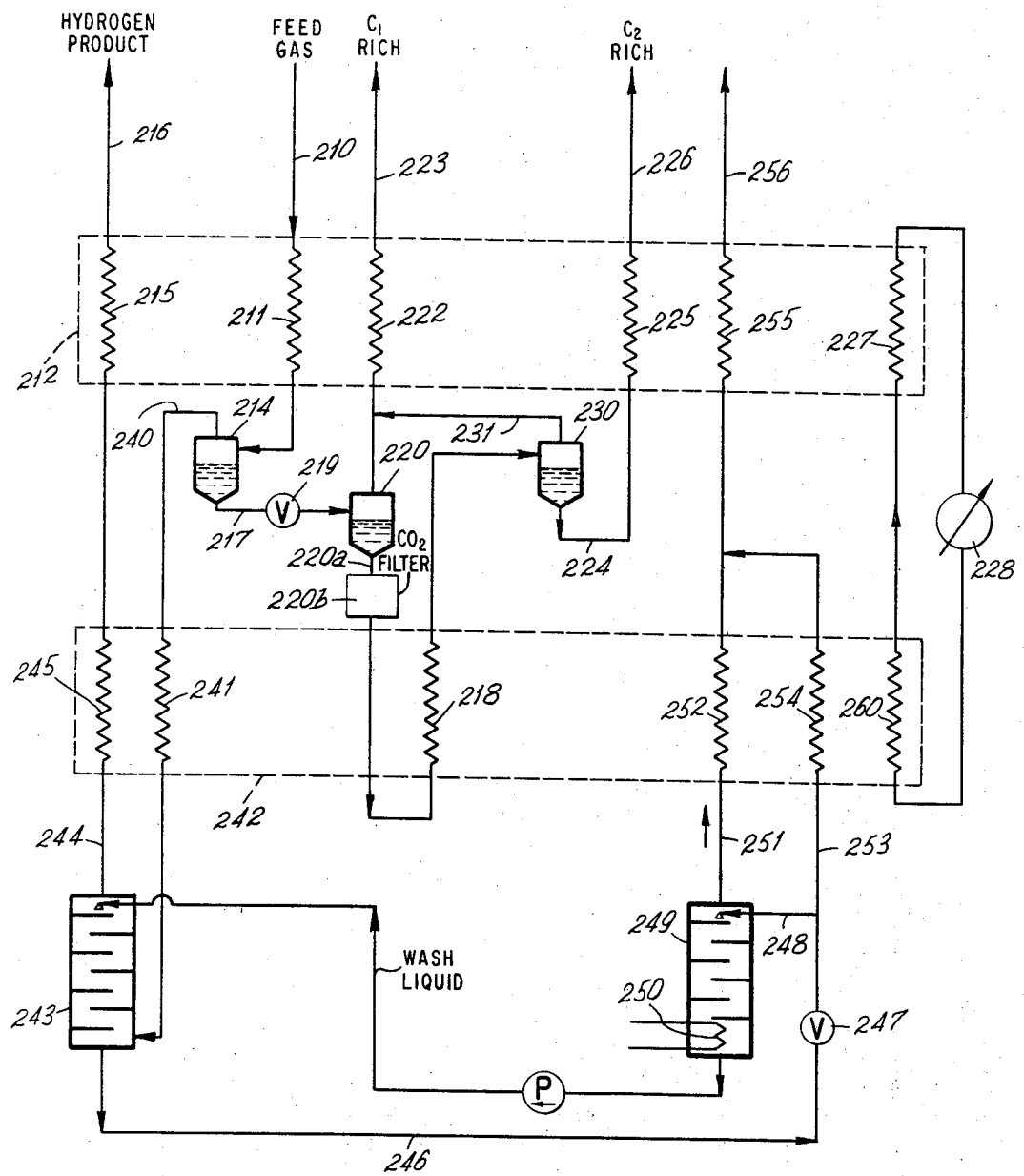
FIG. 3 is a schematic drawing of still another embodiment similar to FIG. 2 but including means for further separating methane and C₂ hydrocarbons from the first stage hydrogen-rich vapor.

FIG. 3 illustrates another embodiment affording further purification of the hydrogen fraction of the feed mixture and thus recovery of substantially all of the methane in the methane-rich product streams. FIG. 3 will be described in terms of a particular feed gas containing 65.0 mole percent $H_2$, 1.2% CO, 20.6% $CH_4$, 13.0% $C_2H_4$, 0.2% $C_2H_6$ and traces of $CO_2$ and $C_2H_2$. Also the various flows will be enumerated on the basis of a feed gas rate of 100 cu. ft. per hour STP. The feed gas is introduced to conduit 210 at 34 atm. and 278° K., cooled to about 145° K. in passageway 211 of first heat exchange zone 212 and directed to first separator 314. The resulting hydrogen-rich vapor is vented through conduit 240, further cooled in passageway 241 of second heat exchange zone 242 to below 120° K., i.e. 114° K.; this vapor comprises 86.1 mole percent $H_2$, 1.4% CO, 12.0% $CH_4$ and 0.5% $C_2$ hydrocarbons. A temperature below 120° K. is necessary to minimize methane contamination of the hydrogen product gas and consequent loss of methane wash liquid. The cooled hydrogen-rich vapor is introduced at the base of wash column 243 and washed therein by downwardly flowing liquid using appropriate liquid-vapor contact means such as trays. In this washing step additional amounts of methane, introgen and $C_2$ hydrocarbons are removed from the vapor and the latter is discharged through overhead conduit 244 for flow through passageway 245 of second heat exchange zone 242. In this zone a portion of the refrigeration from the cold hydrogen product stream is transferred to the counter-currently flowing hydrogen-rich vapor in thermally associated passageway 241. The partially rewarmed product hydrogen emerging from the warm end of second heat exchange zone 242 is directed to the cold end of first heat exchange zone 212 for additional recovery of sensible refrigeration in passageway 215. This product hydrogen is finally discharged through conduit 216 at temperature of 275° K. pressure of 33.3 atm. and a flow rate of 47.9 cu. ft. per hour STP. The product hydrogen stream consists of 99.0 mole percent $H_2$, 1.0% $CH_4$ and 5 p.p.m. CO.

The hydrogen product gas obtained in the FIG. 3 embodiment contains methane in equilibrium with the wash liquid at the temperature and pressure in the top of wash column 243. Still higher purity hydrogen can be produced by passing the cold product hydrogen from this wash column through a second wash column using a deeply subcooled wash liquid capable of absorbing the residual methane content, as for example described in Baker et al. U.S., 3,073,093.

Returning now to wash column 243, the preferred wash liquid is methane although monochlorotrifluoromethane may also be employed. The rich-methane wash liquid comprising 95.9 mole percent $CH_4$ is withdrawn from column 243 through conduit 246 at temperature of 94° K. and flow rate of 30.4 cu. ft. per hour STP. This liquid is throttled through valve 247 to about 1.5 atm. and may be warmed for example by heat exchange with clean wash liquid. The throttled liquid is directed through conduit 248 into the top of distillation-wash liquid regeneration column 249. This column is operated by boiling of methane wash liquid in the base with a warmer fluid in reboiler 250 as for example cold nitrogen vapor condensed therein. The resulting impurity vapor stream is discharged from column 249 at about 6.1 cu. ft. per hour STP through conduit 251 and partially warmed to about 113° K. in passageway 252 of second heat exchange zone 242. In this manner a portion of the impurity stream's refrigeration may be recovered to partially cool the hydrogen-rich vapor in thermally associated passageway 241. Any portion of the rich wash liquid not required for operating wash column 243 may be diverted around regeneration column 249 through conduit 253 to passageway 254 in second heat exchange zone 242 also thermally associated with hydrogen-rich vapor passageway 241. This diverted partially warmed impurity fraction is preferably rejoined with the main partially warmed impurity fraction at the warm end of zone 242 and the combined stream is directed to passageway 255 at the cold end of first heat exchange zone 212. The remainder of the sensible refrigeration from this stream is recovered by the cooling countercurrently flowing feed gas in thermally associated passageway 211 and the further warmed impurity stream is discharged from the system through conduit 256.

The liquid from first separator 214 is at the temperature of the cold end of first heat exchange zone 212 (145° K.) and throttled through valve 219 to a sufficiently lower pressure for a substantial drop in temperature, e.g., 21° to 124° K. The resulting liquid-vapor mixture is then directed to second separator 220. The liquid is withdrawn from separator 220 for the partial rewarming and evaporation step in passageway 218 analogous to rewarming passageway 118 in FIG. 2. The temperature to which this liquid is rewarmed approaches but need not exceed the level of the cold end of first heat exchange zone 212. Therefore, it is not essential that the rewarming be done in first warmer heat exchange zone 212 but alternatively may be effected in colder second heat exchange zone 242 where the refrigeration produced in throttling can be used more effectively. To this end the liquid is withdrawn from second separator 220 through conduit 220a, passed through carbon dioxide filter 220b and directed to reheat passageway 218 thermally associated with hydrogen-rich vapor passageway 241. This liquid is introduced to passageway 218 at flow rate of 22.6 c.f.h. STP, temperature of 124° K., pressure of 4.8 atm. and has the following composition: $H_2$=0.3 mole percent, CO= 0.2%, $CH_4$=42.6%, $C_2H_4$=55.8%, $C_2H_6$=0.9%, with traces of $CO_2$ and $C_2H_2$.

The liquid is 46% vaporized in passageway 218 and emerges therefrom at a temperature of 137° K. and is controlled by the temperature of the hydrogen-rich vapor entering the warm end of second zone 242 through thermally associated passageway 241. The resulting liquid-vapor mixture is directed to third separator 230 and the second methane-rich vapor withdrawn through conduit 231 for mixing with the first methane-rich vapor from second separator 220 in conduit 221 at the cold end of first heat exchange zone 212. This combined methane-rich vapor is directed through passageway 222 of first zone 212 in countercurrent heat exchange relation with thermally associated feed gas passageway 211 for recovery of sensible refrigeration. The warmed methane-rich product is discharged from the system through conduit 223 at temperature of 275° K. and pressure of 10" $H_2O$ gauge. The ethylene-rich liquid is withdrawn from third separator 230 through conduit 224 and directed through passageway 225 for vaporization and warming in countercurrent heat exchange relation with the feed gas mixture in thermally associated passageway 211. The resulting warmed gas is discharged through conduit 226 at a flow rate of 15.8 c.f.h. STP, temperature of 275° K., pressure of 10" $H_2O$ gauge and has the following composition: $C_2H_4$=75.0 mole percent, $CH_4$=23.5%, $$C_2H_6 = 1.2\%$$

and traces of $CO_2$ and $C_2H_2$.

Additional refrigeration is provided by liquid nitrogen in a closed circuit including passageway 260 in colder second heat exchange zone 242, passageway 227 in first warmer heat exchange zone 212, a compressor (not illustrated) and heat exchanger 228. The nitrogen flow rate is 17.4 c.f.h. STP and the pressure drop across the compressor is about 22.4 atm.

Although particular embodiments of this invention have been described in detail it is contemplated that modifications of the process may be made and that some features may be employed without others, all within the scope of the invention.

What is claimed is:

1. In a process for separating methane and $C_2$ hydrocarbon condensibles from a gas mixture with hydrogen by cooling such mixture at pressure of at least 10 atmospheres to about the liquefaction temperature of said methane, separating hydrogen gas and the liquefied condensibles, throttle expanding such liquefied condensibles to a lower pressure below about 5 atmospheres to form a methane-rich vapor fraction and a $C_2$ hydrocarbon-enriched liquid fraction, separating said methane-rich vapor fraction and $C_2$ hydrocarbon-enriched liquid fraction, the improvement comprising partially rewarming said liquefied condensibles prior to the methane vapor-$C_2$ hydrocarbon liquid separation by heat exchange with the cooling gas mixture sufficiently to evaporate between about 15% and 70% of the condensibles.

2. A process according to claim 1 in which said liquefied condensibles are partially rewarmed and evaporated before said throttle expanding.

3. A process according to claim 1 in which said liquefied condensibles are partially rewarmed and evaporated after said throttle expanding.

4. A process for separating methane and $C_2$ hydrocarbon condensibles from a gas mixture with hydrogen comprising the steps of:

(a) providing said gas mixture at pressure of at least 10 atmospheres and cooling same in a heat exchange zone sufficiently for liquefaction of at least most of said methane and $C_2$ hydrocarbon condensibles;
(b) separating a gaseous hydrogen-rich phase and the methane-$C_2$ hydrocarbon liquid phase, and heat exchanging said gas mixture with said gaseous hydrogen-rich phase in said heat exchange zone as a first part of the cooling step (a);
(c) partially rewarming said methane-$C_2$ hydrocarbon liquid phase sufficiently to evaporate between about 15% and 70% of such phase by heat exchange with said gas mixture in said heat exchange zone as a second part of the cooling step (a);
(d) throttling the partially evaporated methane-$C_2$ hydrocarbon mixture to a lower pressure below about 5 atmospheres to form a methane-rich vapor fraction and a $C_2$ hydrocarbon-enriched liquid fraction;
(e) separating said methane-rich vapor fraction and $C_2$ hydrocarbon-enriched liquid fraction;
(f) heat exchanging said methane-rich vapor fraction with said gas mixture in said heat exchange zone as a third part of the cooling step (a), and recovering the warmed methane-rich vapor as a product; and
(g) heat exchanging said $C_2$ hydrocarbon-enriched liquid fraction with said gas mixture in said heat exchange zone as a fourth part of the cooling step (a) thereby vaporizing and warming said fraction and recovering the $C_2$ hydrocarbon-enriched vapor as a product.

5. A process according to claim 1 in which ethylene is said $C_2$ hydrocarbon condensible.

6. A process for separating methane and $C_2$ hydrocarbon condensibles from a gas mixture with hydrogen comprising the steps of:
(a) providing said gas mixture at pressure of at least 10 atmospheres and cooling same in a heat exchange zone sufficiently for liquefaction of at least most of said methane and $C_2$ hydrocarbon condensibles;
(b) separating a gaseous hydrogen-rich phase and the methane-$C_2$ hydrocarbon liquid phase, and warming said gaseous hydrogen-rich phase with said gas mixture in said heat exchange zone as a first part of the cooling step (a);
(c) throttling the methane-$C_2$ hydrocarbon liquid phase to a lower pressure below about 5 atmospheres to form a first methane-rich vapor fraction and a $C_2$ hydrocarbon-enriched liquid fraction;
(d) warming said first methane-rich vapor fraction with said gas mixture in said heat exchange zone as a second part of the cooling step (a) and recovering the warmed first methane-rich gas as product;
(e) partially rewarming said $C_2$ hydrocarbon-enriched liquid fraction sufficiently to evaporate between about 15% and 70% of such liquid by heat exchange with said gas mixture in said heat exchange zone as a third part of the cooling step (a);
(f) separating the partially rewarmed and evaporated fluid into a second methane-rich vapor fraction and a $C_2$ hydrocarbon-further enriched liquid fraction;
(g) further warming said second methane-rich vapor fraction with said gas mixture in said heat exchange zone as a part of the cooling step (a) and recovering the warmed second methane-rich gas as product; and
(h) vaporizing and rewarming the $C_2$ hydrocarbon-further enriched fraction in said heat exchange zone as a fifth part of the cooling step (a), and recovering the warmed gas as a product.

7. A process according to claim 6 in which ethylene is said $C_2$ hydrocarbon condensible.

8. A process for separating a gas mixture consisting essentially of hydrogen, methane and $C_2$ hydrocarbon, comprising the steps of:
(a) providing said gas mixture at pressure of at least 10 atmospheres and cooling same in a first heat exchange zone sufficiently for liquefaction of at least most of said methane and $C_2$ hydrocarbon;
(b) separating a gaseous hydrogen-rich phase and the methane-$C_2$ hydrocarbon liquid phase from the partially liquefied gas mixture;
(c) further cooling the hydrogen-rich gas to temperature below about 120° K. in a second heat exchange zone;
(d) contacting the further cooled hydrogen-rich gas with a colder lean wash liquid thereby transferring most of the remaining methane and $C_2$ hydrocarbon from the gas to the wash liquid;
(e) partially rewarming the purified hydrogen product gas with said hydrogen-rich gas in said second heat exchange zone as a first part of the further cooling step (c), and further rewarming said purified hydrogen gas with said gas mixture in said first heat exchange zone as a first part of the cooling step (a);
(f) throttling the methane-$C_2$ hydrocarbon liquid phase from step (b) to a lower pressure below about 5 atmospheres to form a first methane-rich vapor fraction and a $C_2$ hydrocarbon-enriched liquid fraction and separating the two fractions;
(g) partially rewarming the $C_2$ hydrocarbon-enriched liquid fraction sufficiently to evaporate between about 15% and 70% of such liquid by heat exchange with said hydrogen-rich gas in said second heat exchange zone as a second part of the further cooling step (c);
(h) separating the partially rewarmed and evaporated $C_2$ hydrocarbon-enriched fluid into a second methane-rich vapor fraction and a $C_2$ hydrocarbon-further enriched liquid fraction;
(i) warming the first and second methane-rich vapor fractions with the gas mixture in said first heat exchange zone as a second part of the cooling step (a), and recovering same as product;
(j) vaporizing and rewarming the $C_2$ hydrocarbon-further enriched liquid fraction with the gas mixture in said first heat exchange zone as a third part of the cooling step (a), and recovering the warmed gas as product;
(k) heating the methane and $C_2$ hydrocarbon-containing wash liquid from step (d) only sufficiently to evaporate said methane and $C_2$ hydrocarbon fraction and recycling the resulting lean wash liquid to said step (d); and
(l) partially rewarming at least part of the resulting methane-$C_2$ hydrocarbon vapor with said hydrogen-rich gas in said second heat exchange zone as a third part of the further cooling step (c), and further rewarming said vapor with said gas mixture in said first heat exchange zone as a fourth part of the cooling step (a).

9. A process according to claim 8 in which methane is the wash liquid of step (d).

10. A process according to claim 8 in which ethylene is said $C_2$ hydrocarbon.

11. A process according to claim 8 in which a balance of refrigeration needed for the gas mixture cooling step (a) and the hydrogen-rich gas further cooling step (c) is provided by passing an externally supplied refrigerant through said first and second heat exchange zones in heat exchanging relation with said gas mixture and hydrogen-rich gas.

References Cited
UNITED STATES PATENTS

| | | | |
|---|---|---|---|
| 2,973,834 | 3/1961 | Cicalese | 62—20 X |
| 3,062,015 | 11/1962 | Cost | 62—23 X |
| 3,073,129 | 1/1963 | Grenier | 62—28 |
| 3,205,669 | 9/1965 | Grossmann | 62—23 |
| 1,913,805 | 6/1933 | Hausen | 62—23 X |

NORMAN YUDKOFF, *Primary Examiner.*

WILBUR L. BASCOMB, Jr., *Examiner.*

V. W. PRETKA, *Assistant Examiner.*